United States Patent
Phillips et al.

(10) Patent No.: US 10,645,956 B2
(45) Date of Patent: May 12, 2020

(54) CARBONATED DRINK COMPRISING OMEGA, VITAMINS AND MINERALS

(71) Applicant: Change Nutrition, Inc., Concord, NC (US)

(72) Inventors: James Phillips, Roanoke, VA (US); Wanda Hairston, Holly Springs, MS (US)

(73) Assignee: Change Nutrition, Inc., Concord, NC (US)

( * ) Notice: Subject to any disclaimer, the term of this patent is extended or adjusted under 35 U.S.C. 154(b) by 390 days.

(21) Appl. No.: 15/503,845

(22) PCT Filed: Aug. 14, 2015

(86) PCT No.: PCT/US2015/045380
§ 371 (c)(1),
(2) Date: Feb. 14, 2017

(87) PCT Pub. No.: WO2016/025898
PCT Pub. Date: Feb. 18, 2016

(65) Prior Publication Data
US 2017/0251701 A1    Sep. 7, 2017

Related U.S. Application Data

(60) Provisional application No. 62/045,063, filed on Sep. 3, 2014, provisional application No. 62/037,264, filed on Aug. 14, 2014.

(51) Int. Cl.
*A23L 2/54* (2006.01)
*A23L 2/52* (2006.01)
*A23L 33/12* (2016.01)
*A23L 33/15* (2016.01)

(52) U.S. Cl.
CPC ................................... *A23L 2/54* (2013.01); *A23L 2/52* (2013.01); *A23L 33/12* (2016.08); *A23L 33/15* (2016.08); *A23V 2002/00* (2013.01)

(58) Field of Classification Search
CPC ........... A23L 2/54; A23L 3/3112; A23L 33/15
USPC ................................. 426/590, 601, 477, 487
See application file for complete search history.

(56) References Cited

U.S. PATENT DOCUMENTS

| | | |
|---|---|---|
| 5,397,591 A | 3/1995 | Kyle et al. |
| 5,407,957 A | 4/1995 | Kyle et al. |
| 5,492,938 A | 2/1996 | Kyle et al. |
| 5,711,983 A | 1/1998 | Kyle et al. |
| 6,112,780 A | 9/2000 | Meheen |
| 6,977,166 B1 | 12/2005 | Ratledge et al. |
| 2004/0072330 A1 | 4/2004 | Ratledge et al. |
| 2007/0166411 A1 | 7/2007 | Anthony et al. |
| 2008/0058417 A1 | 3/2008 | Abril et al. |
| 2009/0162525 A1* | 6/2009 | Rivera et al. |
| 2010/0099765 A1* | 4/2010 | Chilton et al. |
| 2013/0189399 A1 | 7/2013 | Ragnarsson et al. |
| 2013/0260006 A1 | 10/2013 | Wells |
| 2015/0173410 A1 | 6/2015 | Phillips et al. |

FOREIGN PATENT DOCUMENTS

WO  2007149590 A3  3/2008

OTHER PUBLICATIONS

Corresponding Australian Application No. 2015301478, filed Feb. 10, 2017.
Corresponding Canadian Patent Application No. 2958076, filed Feb. 13, 2017.
Corresponding European Patent Application No. 15831858.4, filed Mar. 14, 2017.
Corresponding Mexican Patent Application No. MX/a/2017/002003, filed Feb. 14, 2017.
Corresponding PCT Application No. PCT/US2015/045380, filed Aug. 14, 2015.
Corresponding PCT Application No. PCT/US2015/045380, International Search Report and Written Opinion, dated Nov. 20, 2015, 13 pages.
Liqui-Cell; Tech Brief #63; pp. 1-2; May 2, 2009.

* cited by examiner

*Primary Examiner* — Helen F Heggestad
(74) *Attorney, Agent, or Firm* — New River Valley IP Law, P.C.; Michele L. Mayberry

(57) ABSTRACT

Provided herein are carbonated beverages comprising one or more unsaturated fatty acids (e.g., an omega-3, omega-6, and/or amega-9 polyunsaturated fatty acids), wherein the beverages are characterized by having a low oxygen level of less than 500 ppb. Also provided herein are methods for preparing carbonated beverages comprising one or more unsaturated fatty acids (e.g., an omega-3, omega-6, and/or amega-9 polyunsaturated fatty acids), wherein the beverages are characterized by having a low oxygen level of less than 500 ppb.

26 Claims, No Drawings

CARBONATED DRINK COMPRISING OMEGA, VITAMINS AND MINERALS

CROSS-REFERENCE TO RELATED APPLICATIONS

This application is a National Stage application under 35 USC § 371 of International Application No. PCT/US15/45380, filed Aug. 14, 2015, which application claims priority benefit to U.S. Provisional Appl. Nos. 62/037,264, filed Aug. 14, 2014, and 62/045,063, filed Sep. 3, 2014, the disclosures of each of which are hereby incorporated by reference herein in their entireties.

FIELD AND BACKGROUND OF THE INVENTION

In various embodiments, the present invention generally relates to carbonated beverages containing one or more unsaturated fatty acids (e.g., omega 3, omega 6, and/or omega 9 polyunsaturated fatty acids), and methods of preparation and use thereof.

Omegas can be dissolved in normal non-carbonated beverages (drinks) with varying degrees of good stability and shelf life. Historically, omegas when put into a carbonated drink have significant time limited taste and short shelf life issues. By time limited taste, it is meant that over time the taste changes and becomes unsatisfactory for the taster. By short shelf life, it is mean that in certain cases the carbonated drink product may not survive 48 hours after production. Carbonated drink products like Coke, Pepsi and Dr. Pepper desire taste and shelf life of 3 months or greater.

BRIEF SUMMARY OF THE INVENTION

In one aspect, the present invention is directed to a carbonated drink comprising omega, wherein the carbonated drink is contained within a sealed container, wherein the carbonated drink within the container comprises oxygen, wherein the oxygen level within the sealed container is less than 500 parts per billion (ppb). In some embodiments, the oxygen level is less than 250 ppb. In some embodiments, the oxygen level is less than 100 ppb. In some embodiments, the omega is selected from the group consisting of omega 3, omega 6, and omega 9.

The carbonated drinks are characterized by their shelf life. In some embodiments, the carbonated drink has a shelf life of greater than 48 hours. In some embodiments, the carbonated drink has a shelf life of 4 months or more.

In some embodiments, the carbonated drink is a cola drink. In some embodiments, the carbonated drink is a soda drink. In some embodiments, the carbonated drink is clear. In some embodiments, the carbonated drink is colored.

In some embodiments, the carbonated drink further comprises a vitamin. In some embodiments, the carbonated drink further comprises vitamin A. In some embodiments, the carbonated drink further comprises vitamin B. In some embodiments, the carbonated drink further comprises vitamin C. In some embodiments, the carbonated drink further comprises vitamin D. In some embodiments, the carbonated drink further comprises vitamin E.

The carbonated drink can also include other ingredients such as antioxidants and minerals. In some embodiments, the carbonated drink further comprises lipoic acid. In some embodiments, the carbonated drink further comprises lutein. In some embodiments, the carbonated drink further comprises Zeaxanthin. In some embodiments, the carbonated drink further comprises CoQ10. In some embodiments, the carbonated drink further comprises zinc.

In one aspect, the present invention is directed to a beverage comprising one or more unsaturated fatty acids, wherein the beverage is a carbonated beverage characterized by having an oxygen level below 500 ppb (e.g., 0 ppb to 100 ppb or 0 ppb to 20 ppb). In some embodiments, the beverage is provided in a sealed container (e.g., a sealed aluminum bottle). In some embodiments, the beverage is provided in a sealed container having a transmission of UV light of less than 20%. In some embodiments, the beverage is characterized by having a shelf life of at least two weeks (e.g., about 1 month, about 2 months, about 3 months, about 4 months, about 5 months, about 6 months, about 7 months, about 8 months, about 9 months, about 10 months, about 11 months, about 12 months, about 13 months, about 14 months, about 15 months, about 16 months, about 17 months, about 18 months, about 24 months, or any ranges based on these specified numeric values) at room temperature.

In various embodiments, the one or more unsaturated fatty acids can be an omega 3 fatty acid, an omega 6 fatty acid, and/or an omega 9 fatty acid. In some embodiments, the one or more unsaturated fatty acids comprises at least one polyunsaturated fatty acid (PUFA). In some embodiments, the PUFA can be hexadecatrienoic acid, alpha-linolenic acid, stearidonic acid, eicosatrienoic acid, eicosatetraenoic acid, eicosapentaenoic acid, heneicosapentaenoic acid, docosapentaenoic acid (n-3), docosahexaenoic acid, tetracosapentaenoic acid, tetracosahexaenoic acid, linoleic acid, gamma-linolenic acid, eicosadienoic acid, dihomo-gamma-linolenic acid, arachidonic acid, docosadienoic acid, adrenic acid, docosapentaenoic acid (n-6), tetracosatetraenoic acid, tetracosapentaenoic acid, mead acid, or a mixture thereof. In some embodiments, the PUFA can be eicosapentaenoic acid, docosapentaenoic acid (n-3), docosahexaenoic acid, arachidonic acid, docosapentaenoic acid (n-6), and alpha-linolenic acid. In any of the embodiments described herein, the PUFA can be EPA, ALA, DHA, or any combination thereof. In some embodiments, the beverage contains one or more PUFAs in an amount of 0.1% to 25% by weight. In some embodiments, the PUFA(s) is in a natural or an encapsulated form.

In various embodiments, the beverage of the present invention can include additional ingredients such as vitamins, minerals, fiber, amino acids, ingestible acids, colorants, phytochemicals, micronutrients, carotenoids, sweeteners, caffeine, flavoring agents, metal chelating agents, preservatives, and surfactants. Suitable additional ingredients and amounts are described herein. In some embodiments, the beverage contains one or more minerals. In some embodiments, the beverage has a concentration of non-chelated iron of 0 mg/L-0.3 mg/L; a concentration of copper of 0 mg/L-1.0 mg/L; a concentration of aluminum of 0 mg/L to 0.2 mg/L; a concentration of manganese of 0 mg/L to 0.05 mg/L; a concentration of silver of 0 mg/L to 0.1 mg/L; and/or a concentration of zinc of 0 mg/L to 5.0 mg/L. In some embodiments, the beverage includes one or more flavoring agents in an amount of 0.01% to 25% by weight. In some embodiments, the beverage includes one or more antioxidants (e.g., vitamin C, vitamin E, carotenoids) in an amount of 0.1% to 15% by weight. In some embodiments, the beverage includes one or more preservatives in an amount of 0 to 1% by weight. In some embodiments, beverage includes a metal chelating agent (e.g., EDTA). In some embodiments, the beverage includes a sweetener (e.g., fructose). In some embodiments, the beverage includes caffeine. In some embodiments, the beverage includes a vitamin, a mineral, or a combination thereof.

In one aspect, the invention is related to a method of producing the beverage described herein. In some embodiments, the method is directed to producing a beverage comprising a beverage base and one or more polyunsaturated fatty acids. In some embodiments, the method comprising:

a) providing a beverage base having an oxygen level of 0 ppb to 500 ppb;
b) providing a beverage component comprising the one or more polyunsaturated fatty acids, wherein the beverage component has an oxygen level of 0 ppb to 500 ppb;
c) mixing the beverage base and the beverage component; and
d) carbonating and sealing the mixed beverage base and component in a container (e.g., as described herein) to form a sealed system,
wherein the beverage in the sealed system has an oxygen level of 0 ppb to 500 ppb (e.g., between 0 ppb and about 450 ppb, between 0 ppb and about 400 ppb, between 0 ppb and about 350 ppb, between 0 ppb and about 300 ppb, between 0 ppb and about 250 ppb, between 0 ppb and about 200 ppb, between 0 ppb and about 150 ppb, between 0 ppb and about 100 ppb, between 0 ppb and about 50 ppb, between 0 ppb and about 20 ppb, between 0 ppb and about 25 ppb, between 0 ppb and about 15 ppb or between 0 ppb and about 10 ppb). In some embodiments, the beverage in the sealed system has an oxygen level of 0 ppb to about 25 ppb. In some embodiments, the beverage is carbonated to achieve a level of 1 g-8 g $CO_2$ per kilogram of the beverage. In some embodiments, the beverage produced by the methods described herein is characterized by having a shelf life of at least two weeks (e.g., about 1 month, about 2 months, about 3 months, about 4 months, about 5 months, about 6 months, about 7 months, about 8 months, about 9 months, about 10 months, about 11 months, about 12 months, about 13 months, about 14 months, about 15 months, about 16 months, about 17 months, about 18 months, about 24 months, or any ranges based on these specified numeric values) at room temperature.

Various techniques can be used to reduce the oxygen level. In some embodiments, membrane contractor(s) is used for removing dissolved oxygen from the beverage base, beverage component, and/or the mixture of beverage base and component. In some embodiments, the method further comprises removing dissolved oxygen from the beverage base, the beverage component, or the mixed beverage base and component by vacuum. In some embodiments, the method further comprises purging the beverage base, the beverage component, or the mixed beverage base and component by inert gas (e.g., N2) and/or purging the beverage with inert gas before sealing the mixed beverage base and component in the container.

In one aspect, the present invention also provides a method of supplementing dietary to a subject (e.g., a human). In some embodiments, the method comprises administering the subject a carbonated beverage (e.g., as described herein). In some embodiments, one to five servings of the carbonated beverage are administered daily. In some embodiments, the carbonated beverage comprises EPA, DHA, ALA, or any combination thereof.

In one aspect, the present invention also provides a method of lowering triglyceride in a subject (e.g., a human) in need thereof. In some embodiments, the method comprises administering the subject a carbonated beverage (e.g., as described herein). In some embodiments, one to five servings of the carbonated beverage are administered daily. In some embodiments, the carbonated beverage comprises EPA. In some embodiments, the carbonated beverage comprises EPA, DHA, or a combination thereof.

DETAILED DESCRIPTION OF THE INVENTION

Definitions

Unless specifically stated or obvious from context, as used herein, the term "about" is understood as within a range of normal tolerance in the art, for example, within 20% of the stated value, for example, "about 20" includes 16 to 24, and "about 20%" includes 16% to 24% (not 0% to 40%). As used herein, "about" a specific value also includes the specific value, for example, about 10% includes 10%.

Open terms such as "include," "including," "contain," "containing" and the like mean "comprising."

The terms "beverage" and "drink" are used synonymously herein. In any of the embodiments described herein, the beverage or drink of the present invention can be a non-alcoholic drink, for example, a soda, a cola, etc.

As used herein, unless otherwise clear from context, the term "omega" refers generally to omega fatty acids, which include for example, omega 3, omega 6, and omega 9 fatty acids. Useful omega fatty acids include any of those known in the art. In any of the embodiments described herein, the omega fatty acids (e.g., omega 3, omega 6, and/or omega 9 fatty acids) can be used in the form of fatty acids or salts thereof (e.g., free carboxylic acids or sodium salts thereof), esters (e.g., a methyl ester, an ethyl ester, etc.), and/or glycerides (e.g., a triglyceride, a diglyceride, or a monoglyceride). In some embodiments, the omega fatty acids are used in the form of triglycerides. In some embodiments, the omega fatty acids are used in the form of ethyl esters.

As used herein, unless otherwise clear from context, the term "omega 3" refers to omega-3 (n-3) fatty acids, which are methylene interrupted polyenes, which have two or more cis double bonds, separated by a single methylene group and in which the first double bond appears at the third carbon from the last carbon. Non-limiting useful omega 3 fatty acids are described herein.

As used herein, unless otherwise clear from context, the term "omega 6" refers to omega-6 (n-6) fatty acids, which are methylene interrupted polyenes, which have two or more cis double bonds, separated by a single methylene group and in which the first double bond appears at the sixth carbon from the last carbon. Non-limiting useful omega 6 fatty acids are described herein.

As used herein, the term "omega 9" refers to omega-9 (n-9) fatty acids, which can be mono or polyunsaturated, with the first double bond appears at the ninth carbon from the last carbon. Non-limiting useful omega 9 fatty acids are described herein.

As used herein, the term "Polyunsaturated fatty acid" and "PUFA" are used synonymously to refer to fatty acids that contain more than one carbon-carbon double bond in the carbon chain of the fatty acid. Nonlimiting useful PUFAs are described herein. In any of the embodiments described herein, the PUFAs can be used in the form of fatty acids or salts thereof (e.g., free carboxylic acids or sodium salts thereof), esters (e.g., a methyl ester, an ethyl ester, etc.), and/or glycerides (e.g., a triglyceride, a diglyceride, or a monoglyceride). In some embodiments, the PUFAs are used in the form of triglycerides. In some embodiments, the PUFAs are used in the form of ethyl esters.

As used herein, the terms "soda drink", "carbonated drink", and "carbonated beverage" refer to beverages into which carbon dioxide gas under pressure has been dissolved.

As used herein, the term "shelf-stability" or "shelf stable" is understood as a character of or to characterize a beverage or a component in the beverage (e.g., omega 3, omega 6, omega 9 fatty acids) that is substantially unchanged upon storing at room temperature. Methods for determining such shelf-stability are known, for example, as described in the Examples section herein. In some embodiments, shelf stability of the beverage is determined by real time testing. In some embodiments, shelf stability of the beverage is determined by accelerated shelf life testing. As used herein, the "shelf life" of the beverage is expressed as the shelf stability of the beverage at room temperature. For example, a beverage has a shelf life of 12 months means that the beverage remains stable for 12 months at room temperature. In other words, the beverage has a shelf stability of 12 months at room temperature as determined in either of the real time or accelerated shelf life testing.

Carbonated Beverage Compositions

It is known that oxygen affects the quality of taste and the shelf life/stability of various carbonated soft drink products. Carbonated beverages generally target to have oxygen levels within the range of 500 ppb and higher. They have found that oxygen levels within this range produce acceptable stability and taste for their drink products. Further reduction of oxygen level requires extreme measures and different methods from currently protocols used for preparing carbonated beverages. Oxygen removal is used to speed up the filling process, increases the ability to carbonate, increase shelf life, and reduce carbonating costs. These processes do not remove enough oxygen to ensure natural nutritional supplement ingredients do not react with oxygen and promote rancidity. The oils and flavorings currently used in beverages are very shelf stable compared to ingredients sourced from nature that quickly react with oxygen and spoil.

There has never been a commercially available cola drink that contains an omega molecule. This is true whether or not the omega molecule is that of omega 3, omega 6 and omega 9. There are many reasons for this and a major one is that no one has been successful in combining omega and cola in a drink so to provide consistently good taste along with a stable reasonable shelf life.

There is a need for a carbonated cola drink which comprises omega. One that's taste upon production is consistently good from bottle to bottle. In addition, there is a need for such a drink to be stable with a "minimum" shelf life of 4 weeks or greater (preferably 4 months or greater) and with the ability to ship such a drink by way of a non-refrigerated transportation system if needed.

In some embodiments, the invention discloses a carbonated drink comprising omega and the process for making such a drink. In some embodiments, the carbonated drink comprises omega, wherein the carbonated drink is contained within a sealed container, wherein the carbonated drink within the container comprises oxygen, wherein the oxygen level within the sealed container is less than 500 ppb. In some embodiments, the carbonated drink comprising omega can have a taste and shelf life greater than 48 hours and with the use of one or more production processes disclosed below can have a taste and shelf life of 4 months or greater when not opened. In some embodiments, the carbonated drink comprising omega can be colored or clear. In some embodiments, the carbonated drink comprising omega can be a soda or a cola. In some embodiments, the carbonated drink can further comprise a vitamin and/or mineral. In some embodiments, the vitamins can be one or more of Vitamin A, B, C, D, or E. In some embodiments, the carbonate drink can further comprise one or more of: lipoic acid, lutein, Zeaxanthin, CoQ10.

In one aspect, the invention is directed to a beverage comprising one or more unsaturated fatty acids, wherein the beverage is a carbonated beverage characterized by having an oxygen level below 500 ppb.

In any of the embodiments described herein, the carbonated beverage can have a concentration of $CO_2$ of about 1 g-about 8 g (e.g., about 1 g, about 1.5 g, about 2 g, about 2.5 g, about 3 g, about 3.5 g, about 4 g, about 4.5 g, about 5 g, about 5.5 g, about 6 g, about 6.5 g, about 7 g, about 7.5 g, about 8 g, or any ranges based on these specified numeric values) $CO_2$ per kilogram of the carbonated beverage. In some embodiments, the carbonated beverage has a concentration of $CO_2$ of about 1 g-about 5.5 g, or about 3.5 g-about 4.5 g $CO_2$ per kilogram of the carbonated beverage. In some embodiments, the carbonated beverage has a concentration of $CO_2$ of more than 5.5 g (e.g., about 6 g, about 6.5 g, about 7 g, about 7.5 g, about 8 g, or any ranges based on these specified numeric values) $CO_2$ per kilogram of the carbonated beverage. In any of the embodiments described herein, the carbonated beverage can have a concentration of $CO_2$ of about 1 g-about 8 g (e.g., about 5 g-about 8 g, about 5 g-about 7 g $CO_2$, about 5 g-about 6 g, about 6 g-about 8 g, about 6 g-about 7 g, or about 7 g to 8 g) per kilogram of the carbonated beverage.

In any of the embodiments described herein, the pH of the carbonated beverage can be in the range of 1 to 7 (e.g., 1, 2, 3, 4, 5, 6, 7, or any ranges based on these specified numeric values). In some embodiments, the pH of the carbonated beverage is in the range of 0.05 to 5 (e.g., 1, 2, 3, 4, 5, or any ranges based on these specified numeric values). In some embodiments, the pH of the carbonated beverage is about 2 to about 4.5, similar to the commercially available carbonated drinks such as Coke, Sprite, Mountain Dew, Dr. Pepper, Pepsi, Root beer, etc.

The carbonated beverage described herein can be provided in various sealed containers (e.g., sealed bottles) in various sizes before first use/consumption. In some embodiments, the sealed containers (e.g., sealed bottles) have a transmission of UV light of less than 20%. In some embodiments, the carbonated beverage is provided in a sealed metal bottle (e.g., a sealed aluminum bottle), a sealed glass bottle, or a sealed plastic (e.g., optionally coated plastic bottles, e.g., high density polyethylene, Polyethylene Terephthalate, polypropylene) bottle. In some embodiments, the carbonated beverage is provided in a sealed aluminum bottle. In some embodiments, the carbonated beverage is provided in a sealed glass bottle. In any of the embodiments described herein, the carbonated beverage can be provided in a sealed bottle of 2 oz to 4 liters capacity. In some embodiments, the carbonated beverage is provided in a sealed bottle of 7.5 oz, 8 oz, 8.5 oz, 10 oz, 10.5 oz, 12 oz, 14 oz, 16 oz, 18 oz, or 20 oz capacity. In some embodiments, the carbonated beverage is provided in a sealed bottle of 1 liter, 1.5 liters, 2 liters, or 4 liters capacity. In any of the embodiments described herein, one serving (e.g., 7.5 oz, 8 oz, 8.5 oz, 10 oz, 10.5 oz, 12 oz, 14 oz, 16 oz, 18 oz, or 20 oz) of the carbonated beverage can be provided in a sealed bottle. In any of the embodiments described herein, multiple servings of the carbonated beverage can also be provided in a sealed bottle, wherein each serving is of 7.5 oz, 8 oz, 8.5 oz, 10 oz, 10.5 oz, 12 oz, 14 oz, 16 oz, 18 oz, or 20 oz. As used herein, the term "bottle" includes all containers that regularly used in the beverage industry for finished products, such as a can.

The bottles for the carbonated beverage can have various designs (e.g., various shapes and colors etc.), which are known to those skilled in the art.

Unsaturated Fatty Acids

In various embodiments, the carbonated beverages of the present invention can contain one or more unsaturated fatty acids. Useful unsaturated fatty acids include any of those known in the art, for example, those known to be of nutritional value or otherwise edible.

In some embodiments, the one or more unsaturated fatty acids are selected from omega 3 fatty acids, omega 6 fatty acids, and/or omega 9 fatty acids. Non-limiting useful omega 3 fatty acids include Hexadecatrienoic acid; Alpha-Linolenic acid (ALA) (18:3.omega.3); Stearidonic acid (18:4.omega.3); Eicosatrienoic acid; Eicosatetraenoic acid; Eicosapentaenoic acid (EPA) (20:5.omega.3); Heneicosapentaenoic acid; Docosahexacnoic acid (DHA) (22:6.omega.3); Docosapentaenoic acid (DPA, Clupanodonic acid) (22:5.omega.3); Tetracosapentaenoic acid; and nisinic acid (24:6.omega.3). Non-limiting useful omega 6 fatty acids include Linoleic acid (18:2.omega.6); Gamma-linolenic acid (GLA) (18:3.omega.6); Dihomo gamma linolenic acid (DGLA) (20:3.omega.6); Eicosadienoic acid (20:2.omega.6); Arachidonic acid (AA) (20:4.omega.6); Docosadienoic acid (22:2.omega.6); Adrenic acid (22:4.omega.6); and Docosapentaenoic acid (22:5.omega.6); Tetracosatetraenoic acid; and Tetracosapentaenoic acid. Non-limiting useful omega 9 fatty acids include oleic acid, eicosenoic acid, mead acid, erucic acid, and nervonic acid.

In some embodiments, the one or more unsaturated fatty acids include at least one PUFA. Nonlimiting useful PUFAs include hexadecatrienoic acid, alpha-linolenic acid, stearidonic acid, eicosatrienoic acid, eicosatetraenoic acid, eicosapentaenoic acid, heneicosapentaenoic acid, docosapentaenoic acid (n-3), docosahexaenoic acid, tetracosapentaenoic acid, tetracosahexaenoic acid, linoleic acid, gamma-linolenic acid, eicosadienoic acid, dihomo-gamma-linolenic acid, arachidonic acid, docosadienoic acid, adrenic acid, docosapentaenoic acid (n-6), tetracosatetraenoic acid, tetracosapentaenoic acid, mead acid, and a mixture thereof. In some embodiments, the PUFA can be a conjugated fatty acid. Nonlimiting useful conjugated fatty acid include Rumenic acid, α-Calendic acid, β-Calendic acid, Jacaric acid, α-Eleostearic acid, β-Eleostearic acid, Catalpic acid, Punicic acid, Rumelenic acid, α-Parinaric acid, β-Parinaric acid, Pinolenic acid, Podocarpic acid, and Bosseopentaenoic acid.

In some embodiments, the carbonated beverage comprises at least one polyunsaturated fatty acid selected from the group consisting of hexadecatrienoic acid, alpha-linolenic acid, stearidonic acid, eicosatrienoic acid, eicosatetraenoic acid, eicosapentaenoic acid, heneicosapentaenoic acid, docosapentaenoic acid (n-3), docosahexaenoic acid, tetracosapentaenoic acid, tetracosahexaenoic acid, linoleic acid, gamma-linolenic acid, icosadienoic acid, dihomo-gamma-linolenic acid, arachidonic acid, docosadienoic acid, adrenic acid, docosapentaenoic acid (n-6), tetracosatetraenoic acid, tetracosapentaenoic acid, mead acid, and a mixture thereof. In some embodiments, carbonated beverage comprises at least one polyunsaturated fatty acid selected from the group consisting of eicosapentaenoic acid, docosapentaenoic acid (n-3), docosahexaenoic acid, arachidonic acid, docosapentaenoic acid (n-6) and alpha-linolenic acid. In some embodiments, the carbonated beverage comprises eicosapentaenoic acid. In some embodiments, the carbonated beverage comprises docosahexaenoic acid. In some embodiments, the carbonated beverage comprises both eicosapentaenoic acid and docosahexaenoic acid. In some embodiments, the carbonated beverage comprises eicosapentaenoic acid as substantially the only PUFA (e.g., eicosapentaenoic acid is of more than 90%, more than 95%, or more than 99% by weight of total PUFAs in the carbonated beverage). In some embodiments, the carbonated beverage comprises docosahexaenoic acid as substantially the only PUFA (e.g., docosahexaenoic acid is of more than 90%, more than 95%, or more than 99% by weight of total PUFAs in the carbonated beverage). In some embodiments, the carbonated beverage comprises eicosapentaenoic acid and docosahexaenoic acid as substantially the only PUFAs (e.g., the combination of eicosapentaenoic acid and docosahexaenoic acid is of more than 90%, more than 95%, or more than 99% by weight of total PUFAs in the carbonated beverage).

In any of the embodiments described herein, the omega fatty acids and/or PUFAs can be obtained from any known sources, for example, plant oils (e.g., walnut, edible seeds, clary sage seed oil, algal oil, flaxseed oil, Sacha Inchi oil, Echium oil, and hemp oil), fish oils, egg oil, squid oils, krill oils, etc. Methods for obtaining omega fatty acids and PUFAs from various sources are known in the art. For example, microalgae oils are an excellent source of omega-3 fatty acids, particularly DHA (see e.g., U.S. Pat. Nos. 5,397,591, 5,407,957, 5,492,938, 5,711,983, and 6,977,166, and U.S. Publication Number US 2004/0072330). Exemplary of oils derived from microalgae are the oils disclosed in, and oils made according to the methods described in, U.S. Pat. Nos. 5,397,591, 5,407,957, 5,492,938 and 5,711,983 and U.S. Publication number 2007/0166411, including DHASCO® and DHASCO-S® (Martek Biosciences Corporation).

In any of the embodiments described herein, unsaturated fatty acids (e.g., omega fatty acids and/or PUFAs) can be used in the form of fatty acids or salts thereof (e.g., free carboxylic acids or sodium salts thereof), esters (e.g., a methyl ester, an ethyl ester, etc.), and/or glycerides (e.g., a triglyceride, a diglyceride, or a monoglyceride). In some embodiments, omega fatty acids and/or PUFAs in the form of triglycerides are used. In some embodiments, omega fatty acids and/or PUFAs in the form of ethyl esters are used. In some embodiments, omega fatty acids and/or PUFAs in substantially one form are used, e.g., as triglycerides, esters, or fatty acids or salts thereof. In some embodiments, omega fatty acids and/or PUFAs are used in a combination of two or more forms.

Unsaturated fatty acids (e.g., omega fatty acids and/or PUFAs) of various purity grades can be used in the carbonated beverage described herein. For example, in some embodiments, omega fatty acids and/or PUFAs in an edible oil (e.g., plant oil, fish oil, krill oil, egg oil, or squid oil) can be used. In such embodiments, the omega fatty acids and/or PUFAs can have a purity such that they constitute an amount of, for example, about 5% to 60% by weight of the oil. In some embodiments, omega fatty acids and/or PUFAs can be used in a high purity grade, such as more than 90%, more than 95%, or more than 99%. In such embodiments, the omega fatty acids and/or PUFAs are purified or isolated from their respective sources with or without transforming into an ester (e.g., ethyl ester) of the fatty acids.

In any of the embodiments described herein, the unsaturated fatty acids (e.g., omega fatty acids and/or PUFAs) can be used in an encapsulated form. In any of the embodiments described herein, the unsaturated fatty acids (e.g., omega fatty acids and/or PUFAs) can also be used in an non-encapsulated form, for example, as in their respective natural forms.

In any of the embodiments described herein, the unsaturated fatty acids (e.g., omega fatty acids and/or PUFAs) can be mixed in the carbonated beverage described herein to form a clear beverage, which does not appear cloudy by empirical observation (e.g., to the naked eye) and/or does not contain particles or crystals that are visible to the naked eye, or that does not exhibit "ringing." Other methods for determine clarity of a beverage are known in the art. Methods of preparing a clear aqueous composition having PUFAs are also known in the art.

Various amounts of unsaturated fatty acids (e.g., omega fatty acids and/or PUFAs) are suitable for the carbonated beverage described herein. In some embodiments, the carbonated beverage includes unsaturated fatty acids (e.g., omega fatty acids and/or PUFAs), wherein the unsaturated fatty acids are in an amount of about 0.1% to about 25% (e.g., about 0.1% to about 20%, about 0.1% to about 15% by weight, about 0.1% to about 10%, about 0.1% to about 8%, about 0.1% to about 6%, about 0.1% to about 4%, about 0.1% to about 2%, about 0.1% to about 1%, about 1% to about 25%, about 1% to about 20%, about 1% to about 15% by weight, about 1% to about 10%, about 1% to about 8%, about 1% to about 6%, about 1% to about 4%, about 1% to about 2%, about 2% to about 25%, about 2% to about 20%, about 2% to about 15% by weight, about 2% to about 10%, about 2% to about 8%, about 2% to about 6%, about 2% to about 4%, about 4% to about 25%, about 4% to about 20%, about 4% to about 15% by weight, about 4% to about 10%, about 4% to about 8%, about 4% to about 6%, about 6% to about 25%, about 6% to about 20%, about 6% to about 15% by weight, about 6% to about 10%, about 6% to about 8%, about 8% to about 25%, about 8% to about 20%, about 8% to about 15% by weight, about 8% to about 10%, about 10% to about 25%, about 10% to about 20%, about 10% to about 15% by weight, about 15% to about 25%, about 15% to about 20%, or about 20% to about 25%) by weight of the carbonated beverage. In some embodiments, the unsaturated fatty acids (e.g., omega fatty acids and/or PUFAs) are in an amount of about 0.1%, about 1%, about 2%, about 4%, about 6%, about 8%, about 10%, about 15%, about 20%, or about 25% by weight of the carbonated beverage. In some embodiments, the carbonated beverage includes one or more PUFAs selected from eicosapentaenoic acid, docosapentaenoic acid (n-3), docosahexaenoic acid, arachidonic acid, and docosapentaenoic acid (n-6) and alpha-linolenic acid, wherein the one or more PUFAs are in an amount of about 0.1%, about 1%, about 2%, about 4%, about 6%, about 8%, about 10%, about 15%, about 20%, about 25%, or any ranges based on these specified numeric values, by weight of the carbonated beverage. In some embodiments, the one or more PUFAs are eicosapentaenoic acid, alpha-linolenic acid, and/or docosahexaenoic acid.

In some embodiments, each serving of the carbonated beverage (e.g., 7.5 oz, 8 oz, 8.5 oz, 10 oz, 10.5 oz, 12 oz, 14 oz, 16 oz, 18 oz, or 20 oz) includes about 1 mg to about 5 gram (e.g., about 10 mg, about 100 mg, about 200 mg, about 300 mg, about 400 mg, about 500 mg, about 1 gram, about 2 grams, about 3 grams, about 4 grams, about 5 grams, or any ranges between the recited values) of the unsaturated fatty acids (e.g., omega fatty acids and/or PUFAs). In some embodiments, the carbonated beverage includes one or more PUFAs selected from eicosapentaenoic acid, docosapentaenoic acid (n-3), docosahexaenoic acid, arachidonic acid, and docosapentaenoic acid (n-6) and alpha-linolenic acid, wherein the one or more PUFAs are in an amount of about 1 mg to about 5 gram (e.g., about 10 mg, about 100 mg, about 200 mg, about 300 mg, about 400 mg, about 500 mg, about 1 gram, about 2 grams, about 3 grams, about 4 grams, about 5 grams, or any ranges between the recited values) per each serving of the carbonated beverage (e.g., 7.5 oz, 8 oz, 8.5 oz, 10 oz, 10.5 oz, 12 oz, 14 oz, 16 oz, 18 oz, or 20 oz). In some embodiments, the one or more PUFAs is eicosapentaenoic acid, alpha-linolenic acid, and/or docosahexaenoic acid.

Oxygen Level and Shelf-Life

In some aspects, the inventors found that the oxygen level affects the shelf life of a carbonated beverage. Thus, in some embodiments, the carbonated beverage of the present invention is characterized by having a low oxygen level. In any of the embodiments described herein, the carbonated beverage (e.g., before bottling and capping, or after bottling and capping) can have an oxygen level of below 500 ppb (e.g., below 450 ppb, below 400 ppb, below 350 ppb, below 300 ppb, below 250 ppb, below 200 ppb, below 150 ppb, below 100 ppb, below 50 ppb, below 25 ppb, below 20 ppb, below 15 ppb, or below 10 ppb). In any of the embodiments described herein, the carbonated beverage (e.g., before bottling and capping, or after bottling and capping) can also have an oxygen level of between 0 ppb and about 500 ppb (e.g., between 0 ppb and about 450 ppb, between 0 ppb and about 400 ppb, between 0 ppb and about 350 ppb, between 0 ppb and about 300 ppb, between 0 ppb and about 250 ppb, between 0 ppb and about 200 ppb, between 0 ppb and about 150 ppb, between 0 ppb and about 100 ppb, between 0 ppb and about 50 ppb, between 0 ppb and about 20 ppb, between 0 ppb and about 25 ppb, between 0 ppb and about 15 ppb or between 0 ppb and about 10 ppb). In any of the embodiments described herein, the carbonated beverage (e.g., before bottling and capping, or after bottling and capping) can also have an oxygen level of 0 ppb, about 10 ppb, about 15 ppb, about 20 ppb, about 25 ppb, about 50 ppb, about 100 ppb, about 150 ppb, about 200 ppb, about 250 ppb, about 300 ppb, about 350 ppb, about 400 ppb, about 450 ppb, about 500 ppb, or any ranges based on these specified numeric values. As used herein, when it is said that the oxygen level is 0 ppb, it is to be understood by those skilled in the art that the oxygen level is below detection limit of an oxygen measuring device that can detect a level of oxygen at 1 ppb. As understood by those skilled in the art, after bottling and capping, the carbonated beverage is in a sealed environment, i.e., there is substantial no exchange of matter (e.g., O2, water, etc.) between the internal carbonated beverage and the external environment.

In some embodiments, the carbonated beverage in a sealed bottle (e.g., a sealed aluminum bottle, a sealed glass bottle) has an oxygen level of 0 ppb, about 10 ppb, about 15 ppb, about 20 ppb, about 25 ppb, about 50 ppb, about 100 ppb, about 150 ppb, about 200 ppb, about 250 ppb, about 300 ppb, about 350 ppb, about 400 ppb, about 450 ppb, about 500 ppb, or any ranges based on these specified numeric values. In some embodiments, the carbonated beverage in a sealed bottle (e.g., a sealed aluminum bottle, a sealed glass bottle) has an oxygen level of 0 ppb to about 100 ppb, 0 ppb to about 50 ppb, 0 ppb to about 20 ppb, 0 ppb to about 25 ppb, 0 ppb to about 15 ppb, or 0 ppb to about 10 ppb.

In various embodiments, the carbonated beverage described herein is characterized by having a shelf life of more than 48 hours. In any of the embodiments described herein, the carbonated beverage can be characterized by having a shelf life of more than 2 days (e.g., more than 1 week, more than 2 weeks, more than 1 month, more than 2 months, more than 3 months, more than 4 months, more than 5 months, more than 6 months, more than 7 months, more than 8 months, more than 9 months, more than 10 months, more than 11 months, more than 12 months, more than 13 months, more than 14 months, more than 15 months, more than 16 months, more than 17 months, more than 18 months, or more than 24 months). In any of the embodiments described herein, the carbonated beverage can also be characterized by having a shelf life of 2 days, about 1 week, about 2 weeks, about 1 month, about 2 months, about 3 months, about 4 months, about 5 months, about 6 months, about 7 months, about 8 months, about 9 months, about 10 months, about 11 months, about 12 months, about 13 months, about 14 months, about 15 months, about 16 months, about 17 months, about 18 months, about 24 months, or any ranges based on these specified numeric values. In some embodiments, the carbonated beverage is characterized by having a shelf life of about 12 months to about 24 months. In some embodiments, the carbonated beverage is characterized by having a shelf life of about 12 months to about 14 months. In some embodiments, the carbonated beverage is characterized by having a shelf life of about 15 months to about 18 months.

Other Ingredients

In various embodiments, the carbonated beverage described herein can also contain additional ingredients, such as those customarily included in a currently commercial carbonated beverage.

For example, various flavoring agents can be included in the carbonated beverage described herein. Suitable flavoring agents include any of those known in the art. Nonlimiting useful flavoring agents include, for example, fruit flavors, such as guava, kiwi, peach, mango, papaya, pineapple, banana, strawberry, raspberry, blueberry, orange, grapefruit, tangerine, lemon, lime and lemon-lime; cola flavors, tea flavors, coffee flavors, chocolate flavors, dairy flavors, root beer and birch beer flavors, methyl salicylate (wintergreen oil, sweet birch oil), citrus oils and other flavors. In some embodiments, the carbonated beverage described herein includes at least one flavor (e.g., as described herein). In some embodiments, the carbonated beverage described herein includes one flavor (e.g., as described herein). In some embodiments, the carbonated beverage described herein include more than one flavor (e.g., as described herein).

In some embodiments, the carbonated beverage includes one or more flavoring agent in an amount of about 0.01% to about 25% (e.g., about 0.01%, about 0.05%, about 0.1%, about 0.2%, about 0.3%, about 0.4%, about 0.5%, about 0.6%, about 0.7%, about 0.8%, about 0.9%, about 1%, about 2%, about 4%, about 6%, about 8%, about 10%, about 15%, about 20%, about 25%, or any ranges based on these specified numeric values) by weight of the carbonated beverage. In some embodiments, the carbonated beverage includes one or more flavoring agent in an amount of less than 5%, for example, less than 1%, for example, 0.1%, 0.2%, 0.3%, 0.4%, 0.5%, 0.6%, 0.7%, 0.8% or 0.9% by weight of the carbonated beverage. In some embodiments, the carbonated beverage does not include a flavoring agent.

Various vitamins can be included in the carbonated beverage. In some embodiments, the carbonated beverage includes one or more vitamins such as vitamin A, vitamin B, vitamin C, vitamin D, and vitamin E. In some embodiments, the carbonated beverages includes one or more vitamin B, wherein the vitamin B is selected from vitamin B1, vitamin B2, vitamin B3, vitamin B5, vitamin B6, vitamin B7, vitamin B9, and vitamin B12. In some embodiments, the carbonated beverage includes one or more vitamins in an amount of about 0.1% to about 15% (e.g., about 0.1%, about 0.2%, about 0.3%, about 0.4%, about 0.5%, about 0.6%, about 0.7%, about 0.8%, about 0.9%, about 1%, about 2%, about 4%, about 6%, about 8%, about 10%, about 15%, or any ranges based on these specified numeric values) by weight of the carbonated beverage. In some embodiment, each serving (e.g., 7.5 oz, 8 oz, 8.5 oz, 10 oz, 10.5 oz, 12 oz, 14 oz, 16 oz, 18 oz, or 20 oz) of the carbonated beverage includes vitamin A in an amount of about 100 microgram to about 3 mg (e.g., 900 microgram), vitamin B in an amount of about 10 microgram to about 150 mg, vitamin C in an amount of about 10 mg to about 2 g (e.g., 90 mg), vitamin D in an amount of about 5 microgram to about 100 microgram (e.g., 15 microgram), and/or vitamin E in an amount of about 5 mg to about 1 g (e.g., 15 mg). In some embodiments, the carbonated beverage does not contain vitamins. In some embodiments, the carbonated beverage contains more than one vitamin. In some embodiments, the carbonated beverage contains one vitamin.

Various minerals can also be included in the carbonated beverage described herein. In some embodiments, the carbonated beverage includes one or more minerals such as iron (e.g., non-chelated iron), copper, aluminum, manganese, silver, and zinc. In some embodiments, the carbonated beverage has a concentration of non-chelated iron of 0 mg/L-about 0.3 mg/L (e.g., about 0.01 mg/L, about 0.1 mg/L, about 0.2 mg/L, about 0.3 mg/L, or any ranges based on these specified numeric values). In some embodiments, the carbonated beverage has a concentration of copper of 0 mg/L-about 1 mg/L (e.g., about 0.01 mg/L, about 0.1 mg/L, about 0.2 mg/L, about 0.3 mg/L, about 0.4 mg/L, about 0.5 mg/L, about 0.6 mg/L, about 0.7 mg/L, about 0.8 mg/L, about 0.9 mg/L, about 1 mg/L, or any ranges based on these specified numeric values). In some embodiments, the carbonated beverage has a concentration of aluminum of 0 mg/L-about 0.2 mg/L (e.g., about 0.01 mg/L, about 0.1 mg/L, about 0.2 mg/L, or any ranges based on these specified numeric values). In some embodiments, the carbonated beverage has a concentration of manganese of 0 mg/L-about 0.05 mg/L (e.g., about 0.01 mg/L, about 0.02 mg/L, about 0.03 mg/L, about 0.04 mg/L, about 0.05 mg/L, or any ranges based on these specified numeric values). In some embodiments, the carbonated beverage has a concentration of silver of 0 mg/L-about 0.1 mg/L (e.g., about 0.01 mg/L, about 0.02 mg/L, about 0.03 mg/L, about 0.04 mg/L, about 0.05 mg/L, 0.06 mg/L, about 0.07 mg/L, about 0.08 mg/L, about 0.09 mg/L, about 0.1 mg/L, or any ranges based on these specified numeric values). In some embodiments, the carbonated beverage has a concentration of zinc of 0 mg/L-about 5 mg/L (e.g., about 0.1 mg/L, about 0.2 mg/L, about 0.5 mg/L, about 1 mg/L, about 2 mg/L, 3 mg/L, about 4 mg/L, about 5 mg/L, or any ranges based on these specified numeric values). In some embodiments, the carbonated beverage does not include detectable non-chelated iron, i.e., a non-chelated iron concentration of 0. In some embodiments, the carbonated beverage does not include detectable copper, i.e., a copper concentration of 0. In some embodiments, the carbonated beverage does not include detectable aluminum, i.e., an aluminum concentration of 0. In some embodiments, the carbonated beverage does not include detectable manganese, i.e., a manganese concentration of 0. In some embodiments, the carbonated beverage does not include detectable silver, i.e., a silver concentration of 0. In some embodiments, the carbonated beverage does not include detectable zinc, i.e., a zinc concentration of 0. In some embodiments, the carbonated beverage does not include any of iron (e.g., non-chelated iron), copper, aluminum, manganese, silver, and zinc in detectable amount.

Various antioxidants can also be included in the carbonated beverage described herein. In some embodiments, the carbonated beverage includes one or more antioxidants such as Vitamin C, Vitamin E and carotenoids (e.g., beta-carotene), CoQ-10, phenols (e.g., polyphenols), and flavonoids. In some embodiments, the one or more antioxidants are selected from vitamin C, vitamin E, and carotenoids. In some embodiments, the carbonated beverage includes CoQ-10 as an antioxidant. In some embodiments, the carbonated beverage includes one or more antioxidants in an amount of about 0.1% to about 15% (e.g., about 0.1%, about 0.2%, about 0.3%, about 0.4%, about 0.5%, about 0.6%, about 0.7%, about 0.8%, about 0.9%, about 1%, about 2%, about 4%, about 6%, about 8%, about 10%, about 15%, or any ranges based on these specified numeric values) by weight of the carbonated beverage. In some embodiments, the carbonated beverage does not include an antioxidant as described herein.

Various sweeteners can also be included in the carbonated beverage described herein. In some embodiments, the carbonated beverage includes one or more sweetener selected from honey, sugar (e.g., coconut palm sugar, HFCS-90, HFCS 50, pure crystalline fructose, agave nectar, sucrose, brown rice syrup, fructose, or galactose), sugar alcohol (e.g., HSH, maltitol, xylitol, glycerol, sorbitol, lactitol, isomalt, mannitol, or erythritol), natural sweetener (e.g., Yacon Syrup, Brazzein, Curculin, Glycyrrhizin, Luo Han Guo, Lakanto, Rebiana, Miraculin, Monellin, Pentadin, Stevia, Thaumatin, monk fruit extract, or monatin), sugar fiber (e.g., oligofructose or inulin, Jerusalem Artichoke Inulin), or artificial sweetener (e.g., Acesulfame K, Alitame, Aspartame, Cyclamate, Neotame, Saccharin, or Sucralose). In any of the embodiments described herein, the carbonated drink can have one or more sweeteners, for example, a natural sweetener and/or an artificial sweetener. Suitable natural or artificial sweeteners include any of those known in the art. In some embodiments, the carbonated beverage includes one or more sweeteners in an amount of about 0.1% to about 15% (e.g., about 0.1%, about 0.2%, about 0.3%, about 0.4%, about 0.5%, about 0.6%, about 0.7%, about 0.8%, about 0.9%, about 1%, about 2%, about 4%, about 6%, about 8%, about 10%, about 15%, or any ranges based on these specified numeric values) by weight of the carbonated beverage.

Unexpectedly, the inventors found that the omega fatty acids and/or PUFAs make a positive contribution to the taste of the carbonated beverages with a low oxygen level. Thus, in some embodiments, the carbonated beverage of the present invention can have a reduced amount of flavoring agents and/or sweeteners for a more intense flavor due to the infusion of oil. In some embodiments, the carbonated beverage is substantially free of a flavoring agent, a sweetener, or a combination thereof.

Various preservatives can also be included in the carbonated beverage described herein. In some embodiments, the carbonated beverage includes one or more preservatives such as benzyl alcohol, Benzyl Benzoate, Methyl Paraben, and Propyl Paraben. Preservatives for use in beverages are well known. Any known preservative can be used in the carbonated beverage described herein. The amount of preservative for the carbonated beverages described herein can be less than 1% (e.g., less than 0.5%, less than 0.2%, less than 0.1%, less than 0.05%, less than 0.01%) by weight of the carbonated beverage. In some embodiments, the amount of preservative for the carbonated beverage described herein is 0 to about 1% (e.g., about 0.01%, about 0.05%, about 0.1%, about 0.2%, about 0.5%, about 1%, or any ranges based on these specified numeric values) by weight of the carbonated beverage. In some embodiments, the carbonated beverage described herein does not contain a preservative as described herein.

In some embodiments, the carbonated beverage described herein can also include a metal chelating agent. In some embodiments, the metal chelating agent is EDTA. In some embodiments, the amount of metal chelating agent (e.g., EDTA) for the carbonated beverage described herein is 0 to about 1% (e.g., about 0.01%, about 0.05%, about 0.1%, about 0.2%, about 0.5%, about 1%, or any ranges based on these specified numeric values) by weight of the carbonated beverage. In some embodiments, the carbonated beverage described herein does not contain a metal chelating agent (e.g., EDTA).

In any of the embodiments described herein, the carbonated beverage described herein can include additional ingredients such as vitamins, minerals, fiber, amino acids, ingestible acids, colorants, phytochemicals, micronutrients, carotenoids, sweeteners, caffeine, flavoring agents, and/or surfactants. Suitable such ingredients include any of those known in the art (e.g., those exemplified herein). However, in any of the embodiments described herein, the carbonated beverage described herein can also be free of vitamins, minerals, fiber, amino acids, ingestible acids, colorants, phytochemicals, micronutrients, carotenoids, sweeteners, caffeine, flavoring agents, and/or surfactants.

As readily understood by those skilled in the art, the ingredients (and amount thereof) to be included in the carbonated beverages described herein are those safe for human consumption, for example, in foods and beverages, for example, those that are generally recognized as safe for use in beverages at the indicated amount/concentration.

Exemplary Beverage Formulations

In some embodiments, the carbonated drink herein is composed of; deoxygenated H2O, cola flavorings, cola acid, sweetener (or sweeteners), CO2 and Omega 3. (The sweetener can be artificial or natural). In some embodiments, the carbonated drink can be made colored or clear. In some embodiments, a variation of the invention can be that of a carbonated soda drink without cola.

In some embodiments, the invention can also comprise one or more of: the following vitamins: by way of example only, vitamins A, B, C, D, and E.

In some embodiments, the invention can also comprise one or more of lipoic acid, lutein, Zeaxanthin, and CoQ10.

In some embodiments, the invention can also comprise one of more minerals such as zinc.

In some embodiments, the invention can also comprise one or more vitamin combined with one or more of lipoic acid, lutein, Zeaxanthin, CoQ10.

In some embodiments, the carbonated beverage of the present invention is characterized by one or more of the following:

(a) an oxygen level below 500 ppb;
(b) at least one polyunsaturated fatty acid selected from the group consisting of eicosapentaenoic acid, docosapentaenoic acid (n-3), docosahexaenoic acid, arachidonic acid, docosapentaenoic acid (n-6) and alpha-linolenic acid;
(c) a concentration of non-chelated iron of 0 mg/L-0.3 mg/L;
(d) a concentration of copper of 0 mg/L-1.0 mg/L;
(e) a concentration of aluminum of 0 mg/L to 0.2 mg/L;
(f) a concentration of manganese of 0 mg/L to 0.05 mg/L;
(g) a concentration of silver of 0 mg/L to 0.1 mg/L;
(h) a concentration of zinc of 0 mg/L to 5.0 mg/L;
(i) a carbonation level of 1 g-8 g $CO_2$ per Kilogram of the carbonated beverage;

(j) a pH of about 2 to about 4.5; and
(k) a shelf life of at least 2 weeks at room temperature.

In some embodiments, the carbonated beverage is characterized by at least (a), (b), and (k). In some embodiments, the carbonated beverage is characterized by all (a) through (k).

In some embodiments, the carbonated beverage of the present invention is characterized by one or more of the following:
(a) an oxygen level below 100 ppb;
(b) one or more polyunsaturated fatty acids in an amount of 0.1% to 25% by weight, wherein the one or more polyunsaturated fatty acid is selected from the group consisting of eicosapentaenoic acid, docosapentaenoic acid (n-3), docosahexaenoic acid, arachidonic acid, docosapentaenoic acid (n-6) and alpha-linolenic acid;
(c) one or more antioxidants in an amount of 0.1% to 15% by weight;
(d) one or more flavoring agent in an amount of 0.01% to 25% by weight;
(e) a carbonation level of 1 g-8 g $CO_2$ per kilogram of the carbonated beverage;
(f) a pH of about 2 to about 4.5; and
(g) a shelf life of at least 4 months at room temperature.

In some embodiments, the carbonated beverage is characterized by at least (a), (b), and (g). In some embodiments, the carbonated beverage is characterized by all (a) through (g).

In some embodiments, the carbonated beverage of the present invention is sealed in an aluminum bottle, wherein the carbonated beverage is characterized by one or more of the following:
(a) an oxygen level below 25 ppb;
(b) one or more polyunsaturated fatty acids in an amount of 0.1% to 25% by weight, wherein the one or more polyunsaturated fatty acid is selected from the group consisting of eicosapentaenoic acid, docosapentaenoic acid (n-3), docosahexaenoic acid, arachidonic acid, docosapentaenoic acid (n-6) and alpha-linolenic acid;
(c) a carbonation level of 5 g-8 g $CO_2$ per kilogram of the carbonated beverage;
(d) a pH of about 2 to about 4.5; and
(e) a shelf life of 12 months to 18 months at room temperature.

In some embodiments, the carbonated beverage is characterized by at least (a), (b), and (e). In some embodiments, the carbonated beverage is characterized by all (a) through (e).

In some embodiments, one serving of 8 oz of the carbonated beverage of the present invention is provided in a sealed aluminum bottle, wherein the carbonated beverage is characterized by one or more of the following:
(a) an oxygen level below 15 ppb;
(b) one or more polyunsaturated fatty acids in an amount of 0.1% to 25% by weight, wherein the one or more polyunsaturated fatty acid is selected from the group consisting of eicosapentaenoic acid, alpha-linolenic acid, and docosahexaenoic acid;
(c) a carbonation level of 6 g-7 g $CO_2$ per kilogram of the carbonated beverage;
(d) a pH of about 2 to about 4.5;
(e) a metal chelating agent of EDTA in an amount of 0.01% to about 1% by weight of the carbonated beverage; and
(f) a shelf life of 15 months to 18 months at room temperature.

In some embodiments, the carbonated beverage is characterized by at least (a), (b), and (f). In some embodiments, the carbonated beverage is characterized by all (a) through (f).

In some embodiments, the carbonated beverage of the present invention is characterized by one or more of the following:
(a) an oxygen level below 500 ppb;
(b) one or more polyunsaturated fatty acids in an amount of 0.1% to 25% by weight, wherein the one or more polyunsaturated fatty acid is selected from the group consisting of is selected from the group consisting of eicosapentaenoic acid, docosapentaenoic acid (n-3), docosahexaenoic acid, arachidonic acid, docosapentaenoic acid (n-6) and alpha-linolenic acid;
(c) one or more antioxidants in an amount of 0.1% to 15% by weight; wherein the antioxidants is selected from the group consisting of vitamin C, vitamin E, and carotenoids;
(d) one or more flavoring agent (e.g., cola flavor) in an amount of 0.01% to 25% by weight;
(e) one or more sweeteners (e.g., natural or artificial sweeteners described herein) in an amount of 0.1% to 15% by weight;
(f) a carbonation level of 1 g-8 g $CO_2$ per kilogram of the carbonated beverage; (g) a pH of about 2 to about 4.5;
(h) a metal chelating agent of EDTA in an amount of 0.01% to about 1% by weight of the carbonated beverage; and
(i) a shelf life of at least 4 months at room temperature.

In some embodiments, the carbonated beverage is characterized by at least (a), (b), and (i). In some embodiments, the carbonated beverage is characterized by all (a) through (f).

Other carbonated beverages of the present invention can be readily ascertained by those skilled in the art based on the disclosure herein.

Process of Preparing Beverages with Low Level of $O_2$

In one aspect, the invention is directed to a method of preparing a beverage (e.g., the carbonated beverages as described herein) comprising one or more unsaturated fatty acids. In some embodiments, the beverage is a carbonated beverage characterized by having an oxygen level below 500 ppb. In some embodiments, the beverage is a carbonated beverage containing one or more polyunsaturated fatty acids.

Method 1

In some embodiments, the invention is directed to a method of producing a beverage comprising a beverage base and one or more polyunsaturated fatty acids. In some embodiments, the method comprising:
a) providing a beverage base having an oxygen level of 0 ppb to 500 ppb;
b) providing a beverage component comprising the one or more polyunsaturated fatty acids, wherein the beverage component has an oxygen level of 0 ppb to 500 ppb; and
c) mixing the beverage base and the beverage component.

In some embodiments, the method further comprising d) carbonating and sealing the mixed beverage base and component in a container (e.g., as described herein) to form a sealed system,
wherein the beverage in the sealed system has an oxygen level of 0 ppb to 500 ppb. In some embodiments, the beverage in the sealed system has an oxygen level of 0 ppb, about 10 ppb, about 15 ppb, about 20 ppb, about 25 ppb, about 50 ppb, about 100 ppb, about 150 ppb, about 200 ppb, about 250 ppb, about 300 ppb, about 350 ppb, about 400 ppb, about 450 ppb, about 500 ppb, or any ranges based on these specified numeric values. In some embodiments, the beverage in the sealed system has an oxygen level of 0 ppb to about 25 ppb.

In some embodiments, the beverage base is purified water (e.g., reverse osmosis purified water). In some embodiments, the beverage base is purified water (e.g., reverse osmosis purified water) mixed with one or more ingredients selected from vitamins, minerals, fiber, amino acids, ingestible acids, colorants, phytochemicals, micronutrients, carotenoids, sweeteners, caffeine, flavoring agents, and surfactants. Suitable one or more ingredients and the amount thereof are described herein.

In some embodiments, the beverage base has an oxygen level of 0 ppb to 500 ppb (e.g., 0 ppb, about 10 ppb, about 15 ppb, about 20 ppb, about 25 ppb, about 50 ppb, about 100 ppb, about 150 ppb, about 200 ppb, about 250 ppb, about 300 ppb, about 350 ppb, about 400 ppb, about 450 ppb, about 500 ppb, or any ranges based on these specified numeric values). In some embodiments, the beverage base has an oxygen level of 0 ppb to about 25 ppb.

The beverage base with the above indicated low oxygen level can be produced by various techniques. In some embodiments, the beverage base with low oxygen level (e.g., described herein) can be produced by removing dissolved oxygen through membrane contactor. Useful membrane contactors include any of those known in the art for removing oxygen from a liquid. For example, any of the commercially available membrane contactors (e.g., Liqui-Cel membrane contactor) can be used for removing dissolved oxygen from the beverage base. In some embodiments, the membrane contactor process can be repeated until the oxygen level in the beverage base reaches a targeted level, for example, 0 ppb to about 25 ppb. Other deaeration techniques can also be used, either alone or in conjunction with membrane contactor, to remove dissolved oxygen from the beverage base.

The beverage component used in the process comprises one or more polyunsaturated fatty acids (e.g., described herein). In some embodiments, the beverage component is a beverage concentrate to be diluted with the beverage base, wherein the beverage concentrate includes the one or more PUFAs in water, optionally containing one or more other desired ingredients (e.g., sweeteners (e.g., fructose, cola syrup), flavoring agent (e.g., cola flavor), acids (e.g., cola acid, H3PO4), metal chelating agent etc.)) for the beverage. Suitable PUFAs and suitable other ingredients and amounts thereof are described herein. In some embodiments, the PUFA(s) is EPA, DHA, ALA, or any combination thereof.

The beverage component can also be processed such that the oxygen level is from 0 ppb to 500 ppb (e.g., 0 ppb, about 10 ppb, about 15 ppb, about 20 ppb, about 25 ppb, about 50 ppb, about 100 ppb, about 150 ppb, about 200 ppb, about 250 ppb, about 300 ppb, about 350 ppb, about 400 ppb, about 450 ppb, about 500 ppb, or any ranges based on these specified numeric values). In some embodiments, the beverage component has an oxygen level of 0 ppb to about 25 ppb. In some embodiments, the beverage concentrate has an oxygen level of 0 ppb to 500 ppb (e.g., 0 ppb, about 10 ppb, about 15 ppb, about 20 ppb, about 25 ppb, about 50 ppb, about 100 ppb, about 150 ppb, about 200 ppb, about 250 ppb, about 300 ppb, about 350 ppb, about 400 ppb, about 450 ppb, about 500 ppb, or any ranges based on these specified numeric values). In some embodiments, the beverage concentrate has an oxygen level of 0 ppb to about 25 ppb. In some embodiments, the beverage concentrate, when stored in a sealed container (e.g., described herein), has a shelf life of at least two weeks (e.g., about 1 month, about 2 months, about 3 months, about 4 months, about 5 months, about 6 months, about 7 months, about 8 months, about 9 months, about 10 months, about 11 months, about 12 months, about 13 months, about 14 months, about 15 months, about 16 months, about 17 months, about 18 months, about 24 months, or any ranges based on these specified numeric values) at room temperature. As exemplified in the Examples section, shelf stability of the carbonated beverages increases as the level of oxygen decreases. When the oxygen level is in between 0 ppb to 15 ppb, the shelf life of the carbonated beverage is as long as 15 months to 18 months. Thus, in some embodiments, the carbonated beverage is produced such that the oxygen level is as low as possible, for example, approaching 0 and below 20 ppb. Methods for preparing carbonated beverages having oxygen level approaching 0 and below 20 ppb include those described herein.

In some embodiments, wherein the beverage component is a beverage concentrate, dissolved oxygen in the beverage concentrate can also be removed through membrane contactor. Useful membrane contactors include any of those known in the art for removing oxygen from a liquid. For example, any of the commercially available membrane contactors (e.g., Liqui-Cel membrane contactor) can be used for removing dissolved oxygen from the beverage component. In some embodiments, the membrane contactor process can be repeated until the oxygen level in the beverage component reaches targeted level, for example, 0 ppb to about 25 ppb. Other deaeration techniques can also be used, either alone or in conjunction with membrane contactor, to remove dissolved oxygen from the beverage component.

In some embodiments, if necessary, the method of preparing the beverage described herein can include removing dissolved oxygen from the beverage base, the beverage component, or the mixed beverage base and component by vacuum. The vacuum step can be an integral part of the membrane contactor step or a separate step.

The beverage base and component with low oxygen level can then be mixed and proceed to the carbonation process. In some embodiments, the method includes carbonating the beverage to achieve a carbonated level of about 1 g-about 8 g (e.g., about 1 g, about 1.5 g, about 2 g, about 2.5 g, about 3 g, about 3.5 g, about 4 g, about 4.5 g, about 5 g, about 5.5 g, about 6 g, about 6.5 g, about 7 g, about 7.5 g, about 8 g, or any ranges based on these specified numeric values) $CO_2$ per kilogram of the beverage. Carbonation processes for beverages are well-known in the art. Different machinery for carbonation, filling, and capping are known to those skilled in the art, which can be used for the preparation of the carbonated beverage disclosed herein.

Without bound by theories, it is believed that when $CO_2$ is injected into the beverage utilizing, for example, carbonating stones under pressure, the pressure tank is vented from the top where the oxygen collects. Thus, this process (pressure vessel evacuation) can remove $O_2$ from the beverage. This process can be repeated if necessary to achieve a desired targeted O2 level. Samples of the beverage can be tested for O2 levels. Once the targeted O2 level (e.g., described herein) is reached, the beverage can then proceed to a bottling and capping process to afford a finished beverage product in a sealed container (e.g., a sealed aluminum bottle).

In some embodiments, the method of preparing the beverage described herein include a step of adding a metal chelating agent (e.g., EDTA) to the beverage base, the beverage component, or the mixed beverage base and component. Certain commercial available acids (e.g., H3PO4)

contain metals. Without bound by theories, it is believed that adding metal chelating agent can help stabilizing the beverage composition. Suitable metal chelating agents include those known in the art. For example, the metal chelating agent can be EDTA. Suitable amount of metal chelating agents (e.g., EDTA) are described herein.

In some embodiments, the method also includes a step of purging the beverage base, the beverage component, or the mixed beverage base and component by inert gas (e.g., N2); purging the beverage with inert gas (e.g., N2) before sealing the mixed beverage base and component in the container; or a combination thereof.

In some embodiments, the beverage comprises at least one ingredient selected from the group consisting of vitamins, minerals, fiber, amino acids, ingestible acids, colorants, phytochemicals, micronutrients, carotenoids, sweeteners, caffeine, flavoring agents, and surfactants. In some embodiments, the at least one ingredient is provided in a form having an oxygen level of 0 ppb to 500 ppb (e.g., 0 ppb, about 10 ppb, about 15 ppb, about 20 ppb, about 25 ppb, about 50 ppb, about 100 ppb, about 150 ppb, about 200 ppb, about 250 ppb, about 300 ppb, about 350 ppb, about 400 ppb, about 450 ppb, about 500 ppb, or any ranges based on these specified numeric values). In some embodiments, the at least one ingredient is provided in a form having an oxygen level of 0 ppb to about 25 ppb. the at least one ingredient is provided in a form having an oxygen level of 10 ppb to about 50 ppb.

The method described herein above can be used to prepare the beverage (e.g., described herein) with a low oxygen level and with a sufficient shelf life for commercial use. In some embodiments, the beverage thus prepared has a shelf life of at least two weeks (e.g., about 1 month, about 2 months, about 3 months, about 4 months, about 5 months, about 6 months, about 7 months, about 8 months, about 9 months, about 10 months, about 11 months, about 12 months, about 13 months, about 14 months, about 15 months, about 16 months, about 17 months, about 18 months, about 24 months, or any ranges based on these specified numeric values) at room temperature. In some embodiments, the beverage prepared has a shelf life of about 12 months to about 18 months. In some embodiments, the beverage prepared has a shelf life of about 15 months to about 18 months.

Method 2

It has been determined that when omegas are combined with a carbonated beverage product a complex chemical reaction occurs. This reaction happens over time regardless of adding chelating agents and preservatives. The omega molecule reacts with oxygen in the product both in the filling process and over time in the final product in the container. The omegas can react with oxygen immediately and with discernible taste problems in 4 days and up to four weeks or beyond depending on the amount of oxygen found in the product during or following manufacturing. Water can absorb oxygen. The effect of utilizing water that is oxygenated creates a negative taste profile that builds over time. It has been found that the oxygen levels utilized by current carbonated drink companies are too high for making a carbonated drink product comprising omega that can have an acceptable taste and shelf life. In certain embodiments of the invention by utilizing water oxygen filtration processes and removing oxygen below that of 500 parts per billion (ppb) or below (for the carbonated drink comprising omega and any unfilled volume in container) the shelf life and taste profile and stability is substantially extended.

In a first embodiment a carbonated drink product comprising omega was produced in part by utilizing a water oxygen filtration process to remove oxygen down to 500 parts per billion or below (for the carbonated drink comprising omega and any unfilled volume in container) the shelf life and taste profile is substantially extended beyond 48 hours. The process of reducing the oxygen level was with a nitrogen pre and post purge. Such a system is further explained below. The carbonated drink product comprising omega was placed into a sealed air tight aluminum container.

In a second embodiment a carbonated drink product comprising omega was produced in part by utilizing a water oxygen filtration process to remove oxygen down to 250 parts per billion or below (for the carbonated drink comprising omega and any unfilled volume in container) the shelf life and taste profile is substantially extended beyond 48 hours. The process of reducing the oxygen level was with a nitrogen pre and post purge. This time the nitrogen pre and post purge were performed under more stringent conditions. Such a system is further explained below. The carbonated drink product comprising omega was placed into a sealed air tight aluminum container.

In a third embodiment carbonated drink product comprising omega was produced in part by utilizing a water oxygen filtration process to remove oxygen down to 100 parts per billion or below (for the carbonated drink comprising omega and any unfilled volume in container) the shelf life and taste profile is substantially extended beyond 48 hours. The process of reducing the oxygen level was with a nitrogen pre and post purge. This time in addition to the nitrogen pre and post purge, nitrogen post purge an omega pre doser technique was also used. Such a system is further explained below. The carbonated drink product comprising omega was placed into a sealed air tight aluminum container.

In some embodiments, the Invention disclosed herein uses one or more of the following process steps. These are not intended to be a production order. It has been found that the use of one or more of these steps provides the invention with a very unique and satisfying taste that can be maintained over time in a stored sealed container and having a very acceptable shelf life.

Use of a Nitrogen Pre-Purge

Since oxygen removal is a key to the shelf life and taste profile needed, the use of nitrogen pre-purge and post-purge can provide the protection needed for our product. It is important to accurately measure oxygen to ensure oxygen is displaced in the process. Since almost complete removal of oxygen from the water is the goal, the nitrogen purge could allow further protect of the product.

Use of a Nitrogen Post-Purge

Oxygen can come out of solution and concentrate in the headspace of the bottle. Headspace is defined as the area of gas above the beverage inside the sealed bottle after filling. The concentrated oxygen can then react with the omega and cause a reaction effecting taste and product stability.

Omega Post Doser

In a production environment protecting the omegas from oxygen exposure and emulsification damage is one of the key components to a successful shelf life and taste profile that is required. We have learned that the ability to "dose" omegas either in a pre or post production may be required. This will protect the omegas from damage in their encapusuled state and allow the consumer to have an experience that does not include any after taste often associated with omega consumption.

Omega Pre Doser

Pre dosing omega is another valid way to add the omega after the carbonation process where it can bond with oxygen. Omega is dosed into a bottle purged of oxygen with methods like CO2 purging, nitrogen purging or other inert gas purging.

Oxygen Filtration

Gas control is an important concern in the beverage industry. Oxygen in the water can oxidize flavor components and shorten the shelf life of the product. Carbon dioxide can also have an impact on taste and pH of the product. Membrane Contactors utilize a hydrophobic polypropylene membrane to remove dissolved gasses from water. Water flows on one side of the membrane and a vacuum or strip gas is passed on the other side of the membrane. By controlling the pressures of gasses in contact with the water, a highly efficient method for gas control can be achieved. Membrane contactors are widely accepted to control gas levels in liquids used in the soft drink and brewing industries.

Oxygen Removal Utilizing Distillation

Up until World War II, distilling sea water to fresh water was time consuming and expensive in fuel. The saying was: "It takes one gallon of fuel to make one gallon of fresh water." Shortly before the war, Dr. R. V. Kleinschmidt developed the compression still, that became known as the Kleinschmidt Still, for extracting fresh water from sea water or contaminated water. By compressing the steam produced by boiling water, 175 gallons of fresh water could be extracted from sea water for every gallon of fuel used. During World War II this unit became standard on Allied ships and on trailer mounts for armies. This method was in widespread use for ships and portable water distilling units during the latter half of the century. Modern vessels now use flash-type evaporators to boil sea water, heating the water to between 70-80 C and evaporating the water in a vacuum—this is then collected as condensation before being stored.

Keeping a vacuum is critical as the pure water will readily absorb additional oxygen.

Columnar Stability

One way for oxygen to react with omega is unstable columnar stability defined as when an oil is emulsified in a liquid improperly and creates small droplets in suspension. These droplets can trap and capture oxygen and lead to instability. Removal of oxygen can reduce this factor and add increased shelf life.

Carbonation Level

In some embodiments, the invention provides a carbonation level that is higher with the invention than other carbonated cola drinks.

In some embodiments, the carbonated level for the invention is targeted to be within the range of 3.5-4.5 CO2 per volume per sealed container. Some carbonated cola beverages target their range of $CO_2$ at 3.5. The carbonation level required for the invention is higher than other carbonated cola beverages.

Invert of at least 10 hours not greater than 20 hours can be required.

In some embodiments, one of the key factors producing the bold flavor that is required is the invert process for the cola flavor and syrup. This invert process creates the bold flavor as it mixes the flavor oils with the acid. Omegas and Vitamins can then be added after the invert has taken place.

EDTA can be mixed with omegas in pre-mix.

In order to extend shelf life and ensure the taste, in some embodiments, the invention mixes the EDTA early in the process. This EDTA can be premixed with omegas prior to the production of the product and thus protects the omegas as they enter the production environment.

Containers

Bottles may be plastic or aluminum; however conventional plastic bottles are permeable thus this is a major disadvantage in controlling oxygen. Therefore, if a plastic bottle is used, it must be coated or a higher thickness to ensure the lowest permeability to oxygen possible. Aluminum or metal cans are preferred. Whether the container is made of plastic or metal, an air tight top, cap or lid seal is required.

As readily apparent to those skilled in the art, any of the steps or processes discussed in Method 2 can be optionally combined with the steps described in Method 1, and vice versa.

Method of Using Carbonated Beverages

Unsaturated fatty acids (e.g., omega fatty acids or PUFAs) are known to be of nutritional value and offers medical benefits. In one aspect, the invention also provides a method of supplementing dietary to a subject (e.g., a human). In some embodiments, the method comprises administering the subject a carbonated beverage (e.g., as described herein). In some embodiments, one to five servings (e.g., each serving can be of 7.5 oz, 8 oz, 8.5 oz, 10 oz, 10.5 oz, 12 oz, 14 oz, 16 oz, 18 oz, or 20 oz) of the carbonated beverage are administered daily. In some embodiments, the carbonated beverage comprises EPA. In some embodiments, the carbonated beverage comprises ALA. In some embodiments, the carbonated beverage comprises EPA, DHA, ALA, or any combination thereof.

Omega fatty acids such as EPA were known to provide benefit in lowering triglyceride. For example, Epanova is an FDA approved prescription medication used alongside a low fat and low cholesterol diet that lowers high triglyceride (fat) levels in adults. Epanova is derived from fish oil and an ultra pure mixture of the free fatty acids docosahexaenoic acid (DHA) (in about 15-25%) and eicosapentaenoic acid (EPA) (in about 50-60%). Other drugs with omega fatty acids approved for this indication includes Lovaza and Vascepa. In one aspect, the present invention also provides a method of lowering triglyceride in a subject (e.g., a human) in need thereof. In some embodiments, the method comprises administering the subject a carbonated beverage (e.g., as described herein). In some embodiments, one to five servings (e.g., each serving can be of 7.5 oz, 8 oz, 8.5 oz, 10 oz, 10.5 oz, 12 oz, 14 oz, 16 oz, 18 oz, or 20 oz) of the carbonated beverage are administered daily. In some embodiments, the carbonated beverage comprises EPA. In some embodiments, the carbonated beverage comprises EPA, DHA, ALA, or any combination thereof. In some embodiments, the carbonated beverage comprises EPA and DHA, with a ratio of EPA to DHA of about 1:10 to 10:1 (e.g., 1:10, 1:5, 1:1, 2:1, 3:1, 4:1, 5:1, 6:1, 7:1, 8:1, 9:1, 10:1, or any ranges based on these specified numeric values) by weight calculated based on the free fatty acids. In some embodiments, the EPA, DHA, ALA, or any combination thereof are in free fatty acids form. In some embodiments, the EPA, ALA, DHA, or any combination thereof are in the form of ethyl ester.

Other benefits associated with omega fatty acids and PUFAs are known in the art. A person of ordinary skill in the art would readily appreciate that the carbonated beverages described herein can be extended to provide any of such known benefits associated with omega fatty acids and PUFAs. Thus, in some embodiments, the invention is also directed to providing any known benefits associated with omega fatty acids and/or PUFAs comprising administering the carbonated beverages described herein.

EXAMPLES

Example 1. General Process of Preparing Carbonated Beverages Containing Omega Fatty Acids Carbonation processes for beverages are known in the art. Different machinery for carbonation, filling, and capping are known to those skilled in the art, which can be used for the preparation of carbonated beverage disclosed herein.

Briefly, filtered water is purified utilizing reverse osmosis to remove impurities such as iron and heavy metals. Next the beverage ingredients (i.e., flavor, acid, sweetener, omega fatty acids, and any other additional ingredients) and water are mixed and blended, which then are carbonated and enter the filler. Bottles are transported to a conveyor that feeds them to a rinser to remove debris and then are transported to the filler. Upon entering the filler the bottle is sealed against the filling heads. With a strong seal the bottle then is purged of oxygen utilizing $CO_2$ and counter pressure. The pressure of the bottle is now greater than the pressure of the product inside the filler. Product in the bowl of the filler is pressurized with $CO_2$ at or slightly above the desired volumes of carbonation for the final product. Releasing the pressure inside the bottle allows the bottle to fill with carbonated product and displaces oxygen. When the desired fill height is reached the bottle comes out of contact with the fill head and then is sealed utilizing a closure. In some processes as an added protection against oxygen a post dose blanket of inert gas is used to purge the head space of the bottle before the bottle is sealed. In some processes a drop of processed reverse osmosis water with oxygen removed is dripped into the container, generating a release of CO2 to off gas and overflow the headspace of the bottle to ensure oxygen does not enter before the closure is sealed.

Example 2. General Process of Preparing Carbonated Beverages Containing Omega Fatty Acids with Low Oxygen Levels by Pressure Vessel Evacuation Water, $H_2O$, has the ability to absorb gasses, such as oxygen. Thus, to obtain low levels of oxygen in the final beverage product, the process we removed as much oxygen as is necessary and replaced it with inert gas such as $CO_2$. In particular, ingredients were mixed into a stainless steel pressure vessel and then air was purged by adding $CO_2$ from the bottom and purged from the top of the vessel.

For example, various beverage ingredients were then added into a pressure vessel then cooled down to 33° F. At this cold temperature, carbonation of water is more efficient. $CO_2$ was injected into the product column utilizing carbonating stones and also a CO2 pipe and shaken under pressure. As the $CO_2$ was added, the pressure tank was vented from the top where the oxygen collects. Thus, this process removes $O_2$ from the product.

When samples testing shows between 0-100 PPB and the product reaches 4.0 volumes of carbonation, the process is complete. The product can then proceed to bottling and capping to form a finished product.

Each time $CO_2$ is added for carbonation, oxygen is displaced. With agitation, the process can be repeated to remove dissolved oxygen until it reaches certain predetermined level.

The oxygen level of the carbonated beverages can be determined readily by those skilled in the art. For example, the oxygen levels can be tested by using commercial available dissolved oxygen meters such as AquaTrace™ ppb Dissolved Oxygen System from Thermo Scientific Inc. or 3650 ORBISPHERE Portable ppb EC 02 analyzer—beverage, from Hach.

Example 3. Shelf Life Stability Testing for Carbonated Beverages Containing Omega-3 Fatty Acids Shelf life testing can be performed two ways, real time or accelerated shelf life testing. Real time testing follows the following general procedure. First, when product is bottled, oxygen level is measured. The bottled product is then held at room temperature. Standard conditions for temperature and pressure are standard sets of conditions for experimental measurements established to allow comparisons to be made between different sets of data. Here, the test is carried out at room temperature, which is set at 20° C. plus or minus 1° C. At weekly intervals, the products were physically tasted to see if there were noticeable off notes or bad flavor.

For accelerated shelf life testing, individual batches were made, which were tested for oxygen. The samples were then incubated in a lab incubator with temperatures set at between 45° C. to 50° C. Samples were also tasted at weekly intervals. The data can be correlated with room temperature testing data using a time temperature correlation. For example, a sample that is stable at 45° C. to 50° C. for 8 weeks may be calculated to have a stability of 6 months when placed at room temperature.

The stability testing results are shown below in Table 1.

TABLE 1

Relationship between Stability of Cola Drinks having above average and lower than current production Dissolved Oxygen Levels for omega 3 EPA and DHA:

| Stability* | Dissolved Oxygen Levels |
| --- | --- |
| Stable for 1-3 Weeks | 2000 ppb-2400 ppb |
| Stable for 1-2 Months | 669 ppb-800 ppb |
| Stable for 12-14 Months | 10 ppb-25 ppb |
| Stable for 15-18 Months | 0 ppb-15 ppb |

*Stability shown in this table refers to accelerated test results as described above.

Table 1 shows that carbonated beverages containing omega fatty acids achieved long shelf stability when the dissolved oxygen level is low, such as below 25 ppb.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

All of the various aspects, embodiments, and options described herein can be combined in any and all variations.

All publications, patents, and patent applications mentioned in this specification are herein incorporated by reference to the same extent as if each individual publication, patent, or patent application was specifically and individually indicated to be incorporated by reference.

What is claimed is:

1. A carbonated drink comprising:
a carbonated liquid;
one or more omega 6 fatty acid;
one or more omega 3 fatty acid, which is present in an amount greater than the amount of omega 6 fatty acid; and
an oxygen level of less than 500 ppb.

2. The carbonated drink of claim 1, comprising docosahexaenoic acid (DHA) and eicosapentaenoic acid (EPA).

3. The carbonated drink of claim 2, wherein the DHA is present in an amount greater than the amount of EPA.

4. The carbonated drink of claim 1 comprising oleic acid and/or linoleic acid.

5. The carbonated drink of claim 1, wherein the oxygen level is 0 ppb to 100 ppb.

6. The carbonated drink of claim 1, wherein the oxygen level is 0 ppb to 20 ppb.

7. A carbonated cola drink comprising:
water;
cola flavoring;
omega;
carbon dioxide ($CO_2$); and
an oxygen ($O_2$) level of less than 500 ppb.

8. The carbonated cola drink of claim 7, further comprising artificial or natural sweetener.

9. The carbonated cola drink of claim 7, wherein the $CO_2$ is present in an amount ranging from 1 g $CO_2$ to 8 g $CO_2$ per kilogram of cola drink.

10. The carbonated cola drink of claim 7, wherein the $CO_2$ is present in an amount higher than 3.5 v/v % up to 4.5 v/v %.

11. The carbonated cola drink of claim 7, wherein the $O_2$ level is less than 250 ppb.

12. The carbonated cola drink of claim 7, wherein the $O_2$ level is less than 100 ppb.

13. The carbonated cola drink of claim 7, wherein the omega is omega 3, omega 6, and/or omega 9.

14. The carbonated cola drink of claim 7, wherein the omega is omega 3 and/or omega 6.

15. The carbonated cola drink of claim 7, wherein the omega is omega 3 and/or omega 9.

16. The carbonated cola drink of claim 7 further comprising vitamin(s) or mineral(s).

17. The carbonated cola drink of claim 7 having a shelf life of 3 months or more.

18. A method of preparing a carbonated drink comprising:
combining deoxygenated water with omega;
dispensing the deoxygenated water and the omega into a bottle before, during, and/or after the combining;
purging oxygen ($O_2$) to a level of less than 500 ppb by:
(i) performing $O_2$ filtration of the deoxygenated water before, during, and/or after the combining;
(ii) exposing the deoxygenated water and/or contents of the bottle to inert gas before, during, and/or after the dispensing;
(iii) carbonating the deoxygenated water with carbon dioxide ($CO_2$) before, during, and/or after the combining; and
(iv) exposing any headspace of the bottle to inert gas before, during, and/or after the dispensing; and
producing a carbonated drink comprising less than 500 ppb oxygen as a result of the above steps.

19. The method of claim 18 comprising:
performing the $O_2$ filtration before the combining;
carbonating with $CO_2$ after the combining; and
exposing the headspace of the bottle to inert gas after the dispensing.

20. The method of claim 18, wherein the inert gas is nitrogen or $CO_2$.

21. The method of claim 18, further comprising adding cola flavoring.

22. The method of claim 18, wherein the omega comprises omega 3 and/or omega 6.

23. The method of claim 18, wherein the omega comprises omega 3, omega 6, and/or omega 9.

24. The method of claim 18, wherein the omega comprises omega 3 and/or omega 9.

25. The method of claim 18, wherein the omega is dispensed after performing one or more of steps (i), (ii), (iii), and/or (iv).

26. The method of claim 18, wherein the carbonated drink has a shelf life of 3 months or more.

* * * * *